(12) United States Patent
Chaudhry et al.

(10) Patent No.: US 9,838,727 B1
(45) Date of Patent: Dec. 5, 2017

(54) METHOD AND SYSTEM FOR DISCOVERING AN IDENTITY PROVIDER

(75) Inventors: Kapil Chaudhry, Cerritos, CA (US); David N. Schlacht, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1758 days.

(21) Appl. No.: 13/031,105

(22) Filed: Feb. 18, 2011

(51) Int. Cl.
  *H04N 7/16* (2011.01)
  *H04N 21/258* (2011.01)

(52) U.S. Cl.
  CPC .............. *H04N 21/25816* (2013.01)

(58) Field of Classification Search
  CPC ............................................ H04N 21/25816
  See application file for complete search history.

(56) References Cited

U.S. PATENT DOCUMENTS

| | | | |
|---|---|---|---|
| 7,043,230 B1 | 5/2006 | Geddes | |
| 7,478,434 B1 | 1/2009 | Hinton et al. | |
| 7,565,554 B2 | 7/2009 | Joosten et al. | |
| 8,176,163 B1 | 5/2012 | Fikes et al. | |
| 8,364,970 B2 | 1/2013 | Fu | |
| 8,819,848 B2 | 8/2014 | Moore | |
| 2004/0054750 A1 | 3/2004 | de Jong et al. | |
| 2004/0117430 A1 | 6/2004 | Bazot et al. | |
| 2005/0044377 A1 | 2/2005 | Huang | |
| 2005/0066353 A1 | 3/2005 | Fransdonk | |
| 2005/0086683 A1* | 4/2005 | Meyerson | 725/30 |
| 2005/0262026 A1 | 11/2005 | Watkins | |
| 2006/0272031 A1 | 11/2006 | Ache et al. | |
| 2007/0118889 A1 | 5/2007 | Fredell | |
| 2007/0203714 A1 | 8/2007 | McEnroe et al. | |
| 2007/0240195 A1 | 10/2007 | Doran | |
| 2008/0134312 A1 | 6/2008 | Ache et al. | |
| 2009/0158316 A1 | 6/2009 | Kokernak et al. | |

(Continued)

OTHER PUBLICATIONS

Hughes et al.; Profiles for the OASIS Security Assertion Markup Language (SAML) V2.0; Mar. 15, 2005; http://docs.oasis-open.org/security/saml/v2.o/; pp. 31-32.*

(Continued)

*Primary Examiner* — Joshua Taylor
(74) *Attorney, Agent, or Firm* — Harness, Dickey & Pierce, P.L.C.

(57) ABSTRACT

A method and system includes an external service provider that receives a request for restricted content, forms, at the external service provider, a redirection request based on the request for restricted content, an external service provider identifier, and a return response location identifier. The system also includes a discovery service that receives the redirection request from the external service provider and parses the redirection request to obtain an identity provider location identifier and the external service provider identifier when a common domain cookie exists in the redirection request. The discovery service generates a response based on the return response location identifier wherein the response comprises the identity provider location identifier. The external service provider receives the response, generates an authentication request and communicates the authentication request to the identity provider based on the identity provider location identifier.

12 Claims, 3 Drawing Sheets

(56) References Cited

U.S. PATENT DOCUMENTS

2012/0008786 A1     1/2012    Cronk et al.
2012/0151077 A1     6/2012    Finster
2012/0210340 A1*   8/2012    Reynolds et al. .............. 725/23

OTHER PUBLICATIONS hackingnetflix.com; "What Happens When You Hit Netflix's 6 Streaming Device Limit?"; Mar. 12, 2010; one page.
Final Rejection dated Jun. 5, 2013 in U.S. Appl. No. 13/031,094, filed Feb. 18, 2011 by Kapil Chaudhry et al.
Non-final Office action dated Nov. 19, 2012 in U.S. Appl. No. 13/031,094, filed Feb. 18, 2011 by Kapil Chaudhry et al.
Non-final Office action dated Jul. 15, 2015 in U.S. Appl. No. 13/031,094, filed Feb. 18, 2011 by Kapil Chaudhry et al.

* cited by examiner

METHOD AND SYSTEM FOR DISCOVERING AN IDENTITY PROVIDER

TECHNICAL FIELD

The present disclosure relates generally to communication systems for communicating data to a user device, and more particularly, to a method and system for discovering an identity provider for a user device request so that authentication of the user device may be performed.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Conditional access is provided at the user device in the form of a card that allows the user device to receive and process signals from the primary service provider.

Providing secure access to data is important for a primary service provider. At certain time such as an Olympic event, networks may share coverage with other networks or service providers. Providing access to the content to customers of another service provider is desirable. Accessibility for the content is also important. An example of a type of data that may be provided includes program guide data and other types of data such as metadata associated with the guide data. Security is important for the content and to prevent unauthorized access of the content.

SUMMARY

The present disclosure provides a system and method for discovering a location associate with an identity provider.

In one aspect of the invention, a method includes receiving a request for restricted content at an external service provider, forming, at the external service provider, a redirection request based on the request for restricted content, an external service provider location identifier, and a return response location identifier and communicating the redirection request from the external service provider to a discovery service. The method also includes parsing the redirection request at the discovery service to obtain an identity provider location identifier and the external service provider identifier when a common domain cookie exists in the redirection request. The method also includes generating a response at the discovery service with the identity provider location identifier, communicating the response to the external service provider based on the return response location identifier with the identity provider location identifier, generating an authentication request at the service provider and communicating the authentication request to the identity provider based on the identity provider location identifier.

In another aspect of the invention, a system includes an external service provider that receives a request for restricted content and forms a redirection request based on the request for restricted content, an external service provider identifier, and a return response location identifier. The system also includes a discovery service that receives the redirection request from the external service provider. When a common domain cookie exists in the redirection request, the discovery service and parses the redirection request to obtain an identity provider location identifier and service provider identifier. The discovery service generates a response based on the return response location identifier with the identity provider location identifier. The external service provider receives the response, generates an authentication request and communicates the authentication request to the identity provider based on the identity provider location identifier.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
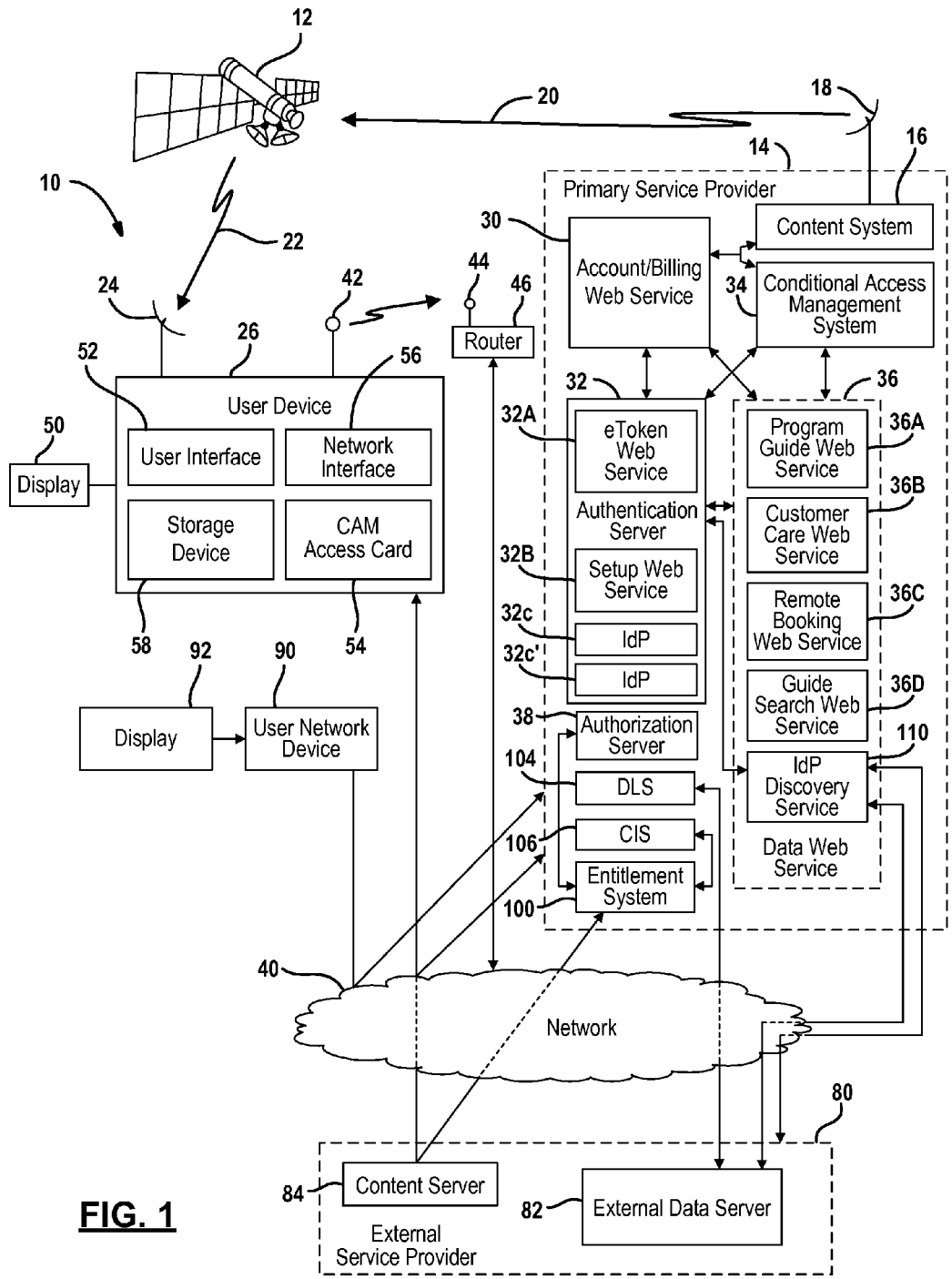
FIG. 1 is a block diagrammatic view of a first embodiment of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

The word, service, is used to convey hardware, software or a combination thereof. The service may be implemented in a computer file server or web server. Servers may be standalone or combined to have various functions. The servers may be physically located in one location or multiple locations. More than one actual server device may perform a particular function. When more than one server is used, they may be distributed geographically. Servers have an associated memory in which data is stored. Servers provide different functions to prevent overloading and maintain service speed. The servers may have "containers" therein that provide the unique environment. The containers may be used interchangeably with web server herein. The containers execute the process in the web server.

The following system is designed to ingest schedule data from an external service provider. The schedule data may include various data associated or relevant to the content that is or will be provided from the external service provider. Examples include but are not limited to identifiers which are numeric or alphanumeric identifiers for the content, network, channel and third-party identifier. Other data may include but are not limited to the title, a description, start time, end time, publish date, end publish date, category, maturity rating, actor and series.

Referring now to FIG. 1, a satellite television broadcast system 10 is illustrated. The satellite television broadcast system 10 is illustrated by way of example. However, the present disclosure is not so limited hereto as mentioned above. The television broadcast system 10 includes a satellite 12 that receives content or programming from a primary service provider 14. More specifically, the primary service provider 14 includes a content system 16 that generates uplink signals 20 corresponding to content through an uplink antenna 18. The content system 16 may have content stored therein or pass content therethrough as in live television broadcasting. Thus, the content system 16 may provide both stored content and live content to user devices. The content may be communicated through a terrestrial or extraterrestrial source. The primary service provider 14 may provide the final link to a user device 26 that is associated with the primary service provider (e.g. a subscriber).

The uplink signals 20 may be content signals or television signals and more specifically digital content or television signals. The uplink antenna 18 communicates the uplink signals 20 to the satellite 12 which in turn generates downlink signals 22. The downlink signals 22 are communicated to a receiving antenna 24 at the user device 26. Although only one user device 26 is illustrated, several user devices may be provided in the system 10. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices 26 may be used such as a cable television set top box. Other types of user devices 26 may include a mobile device such as a lap top computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The primary service provider 14 may also include an account/billing web service 30 and an authentication server 32. The authentication server 32 may include an encrypted token (eToken) web service 32A and a setup web service 32B. The eToken web service 32A may be used to generate and validate eTokens. The generation and validation process will be further described below. The setup web service 32B may be used to setup or establish information so that an eToken may be generated. The set-up process will be described further below.

An identity provider (IdP) 32C and a second identity provider 32C' may be provided within the authentication server 32. The identity provider 32C, 32C' is used for authenticating the user or request from a user or user device 26. The identity providers authenticate the users so that access may be provided to various types of content such as premium web video content. Although two identity providers are illustrated, one or more than two may be used in an implementation.

The primary service provider 14 may also include a conditional access management system 34. The conditional access management system 34 may be used to grant access based upon certain conditions like subscribing to various programming as well as provide recording commands to the user device 26 as will be described below.

The primary service provider 14 may also include a data web service 36. The data web service 36 may include a programming guide web service 36A, a customer care web service 36B and a remote booking web service 36C.

The program guide web service 36A may be used to generate program guide data and information regarding various programming that is available. The program guide web service 36A, as will be described below, may generate custom programming guide information based upon the subscription to which a user is subscribed. The program guide web service 36A may also provide generic or non-customized content when specific user attributes are not known. When user attributes such as location and subscription information are known, only the content available to the particular subscriber may be included in the program guide. Additional content may be provided for advertising purposes. Thus, channel data for particular channels may be provided in the program guide. Content available from an external service provider (80 described below) may also be included in the program guide data. This will be described below.

The program guide web service 36A may generate program guide data for both linear and non-linear content. Linear content are television shows broadcasted at a particular time and a particular channel. Network television programming is an example. Non-linear content is programming that is not tied to a particular time such as on-demand content that can be requested at the user's discretion.

The customer care web service 36B may be used to generate and provide users with various types of help mechanisms to resolve technical issues.

The remote booking web service 36C may be used to generate remote booking commands or recording instructions as will be described below. The remote booking commands or recording instructions may be transmitted through the uplink antenna 18 to the satellite 12 and downlinked through the downlink signal 22 to an antenna 24 on the user device 26. A remote booking command may then initiate the user device 26 to store content broadcast by the satellite 12 thereon.

A guide search web service 36D may be used to provide searching capabilities to customers of the partner service provider. The searching may take place using stored data within the DIRECTV® listing service 104. The searching as described below may be for linear content, non-linear content or a combination of linear and non-linear content. Both types of content could be made available to customers of the primary service provider to search. Customers of the partner or external service provider and not of the primary service provider may also be provided with access to linear content and potentially non-linear. This may allow potential primary service provider customers to see the wide variety of choices provided by the primary service provider. Non-customers of the provider system may be referred to as a generic user. Generic users may thus be provided with search results from national channels and local channels, if location information is provided.

The primary service provider 14 may also include an authorization server 38. The authorization server 38 may provide authorizations to users and prevent users from having too many simultaneous streams. The authorization server may also be used to prevent access to content that a user has not subscribed to.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The network 40 may also be an intranet. The components of both the primary and partner service provider may be located separately or in the same building.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

The user device 26 may generate a common domain cookie and include the cookie in a communication header. For example, the CDC may be included in an HTTP request header.

The primary service provider 14 may be in communication with an external service provider 80. The primary service provider 14 and external provider 80 may be separate companies that coordinate operations at least to some aspects of their businesses. The external provider may provide content or content schedules to the primary service provider for a limited amount of content. This is particularly suitable for sporting events or the like. The primary service provider 14 may thus provide access to content provided by the external provider to its customers. The customers may or may not be aware of the different source of the material.

The external service provider 80 may include an external data server 82 and an external content server 84. The external data server 82 may provide the program guide web service with program guide data, a product data, graphics data and data about specific actions, celebrities, producers, and the like. Metadata may also be provided by the external service provider 80. The metadata may include various descriptions, network or channel affiliations and the like. One example of an external data that may be provided is the Tribune Media Service® (TMS) identifier. TMS is a commercial service that provides various product content data such as metadata (titles, identifiers, descriptions) and schedules to service providers. Other data providers may be used. The external service provider 80 may provide unique identifiers for each piece of content. The data provided by the external service provider 80 may include movie data, graphics types, TV show data, celebrity data, TV show cards, and other data. Data may also be provided for upcoming movies, shows and other events. The external data provider 80 may include a file transfer protocol server 82 for transferring files in a desired format.

The content server 84 may provide content to the primary service provider 14. The content may be various types of content including promotional content which is relatively short in nature and full-length movies. Other types of content may be provided such as television programming, sports clips and highlights and commercial material. The content server 84 may be in communication with the primary service provider 14 through the network 40. The content server 84 may also be in communication with the user device 26 through the network 40. In one embodiment of the disclosure, the primary service provider may provide data with respect to content that is available to the user device 26. After the user device 26 is authorized, the external service provider may also provide the content directly to the user device 26. The primary service provider 14 may also provide the content from the content server 84 as a pass-through to the user device 26 from the external service provider.

The system 10 may also include a user network device 90 that includes a display 92. The display 92 may be separate or integrated into the user network device 90. The user network device 90 may be a web browsing device such as a portable computer, a personal digital assistant, a portable video player, an automotive-based user device, or the like. For certain aspects of the disclosure, the set top box or user device 26 may be considered a user network device since browsing and obtain content and schedules may be performed therefrom. The user network device 90 may receive various data from the servers within the primary service provider 14. The display 92 may be used for displaying various program guide information, along with other information provided by the partner service provider. The other information may include financial information, weather information, voicemail information, or other types of information. The primary service provider 14 may provide the content to be displayed on a website in various manners together with or in addition to the program guide information or other information.

The primary service provider 14 may also include a television listing server (DLS) database 104. The television listing server database 104 may include data corresponding to various listings for various program times and schedules. The television listing server database 104 may be in communication with the external data provider 80.

A content ingestion system 106 may also be provided within the primary service provider 14. The content ingestion system 106 is used to ingest the partner schedule into the primary service provider data system. The data is used to authorize users of the primary service provider to access the content as well as provide access to the underlying data. The ingestion process will be described below.

The primary service provider 14 may also include an entitlement system 100. The entitlement system 100 may be used to determine the entitlement of the user device 26. That is, the user device 26 may be entitled to or subscribed to various contents and various channels. Authorization from the content available from the external service provider may be limited to content that has been subscribed to. The entitlement system 100 will be further described below.

The primary service provider 14 may also include an IdP discovery service 110. The IdP discovery service 110 is used by the external service provider 80 to identify the preferred identity provider of the user device 26. The relationship between the service provider and the identity provider may be a many-to-many relationship. Thus, the external service provider is required to identify the correct identity provider for the user. As is illustrated in FIG. 1, two identity providers 32C and 32C' are provided within the authentication server 32. However, numerous identity providers may be provided that are in control of the primary service provider 14. The IdP discovery service 110 may be co-located with the primary service provider or located at another location but in communication with the primary service provider 14.

Figure 2:
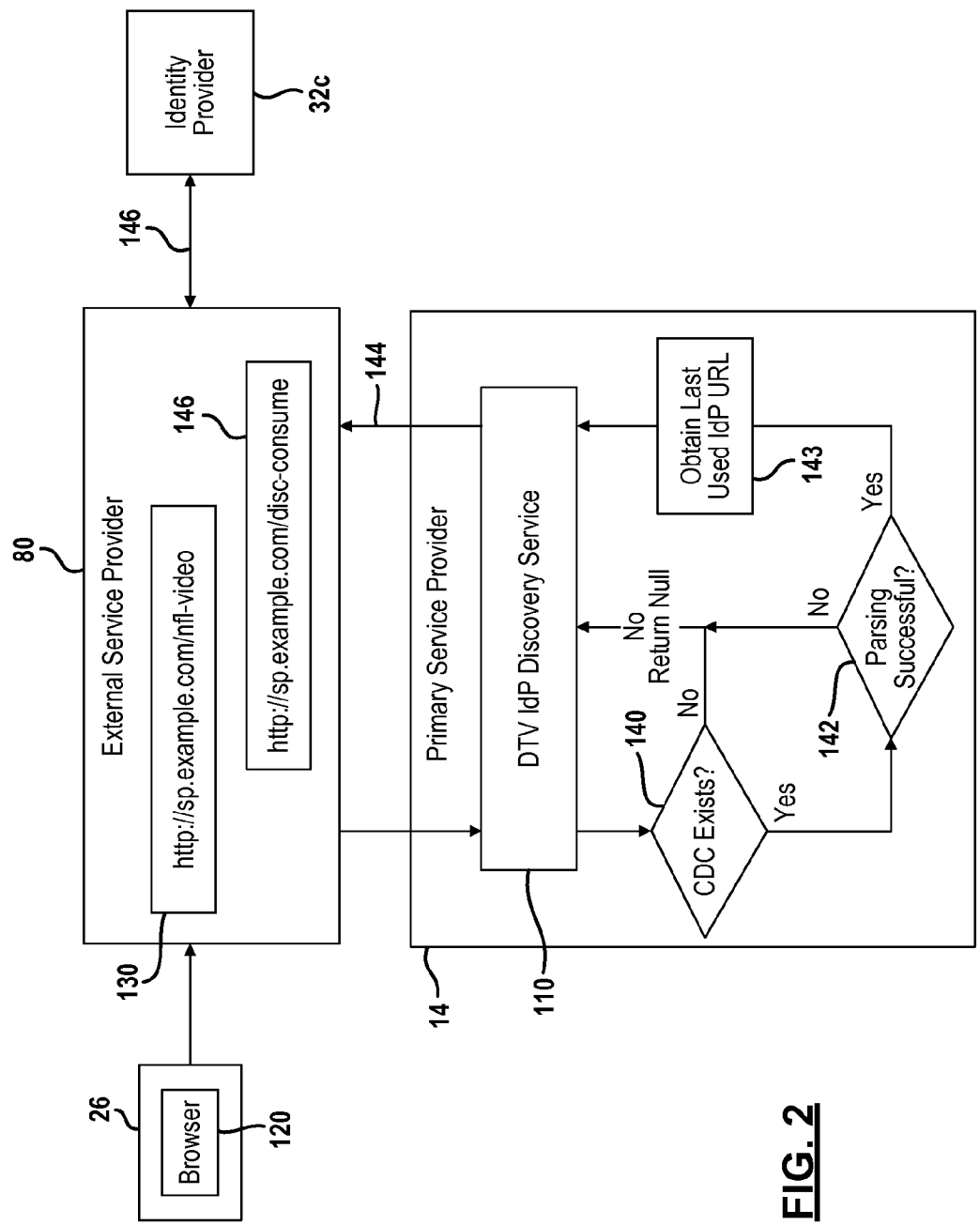
FIG. 2 is a high-level block diagrammatic view of the discovery process.

Referring now to FIG. 2, a simplified block diagrammatic view of a system according to the present disclosure is set forth. In this example, a user device 26 may include a browser 120 that is used for communicating with an external service provider 80. A graphical user interface may be used for selecting various selections according to the specific use. The external service provider 80 may be contacted through the browser 120 using various types of networks. The present disclosure is particularly suitable for conditions in which the user associated with the user device 26 tries to access restricted comment within the domain of the external service provider. In this example, a location identifier such as "HTTP://sp.example.com/nfl-video" is a location of restricted content. The user device 26 may also communicate a common domain cookie having a URL that may list the locations of previously accessed identity providers.

Prior to the process the external service provider may pre-register with the discovery server. The discovery server may store a token or an external service provider identifier therein.

The external service provider 80 may redirect the request to form a redirection request to the identity provider discovery service 110 that is located or associated with the primary service provider 14. The common domain cookie (CDC) may also be communicated with the redirection request. Also, other parameters may also be included with the redirection requests that are inserted by the external service provider. The redirection request may also include a service provider identity that identifies the service provider with an identifier such as a numeric identifier or an alpha-numeric identifier, a return location identifier that provides a location for the discovery service 110 to communicate a response to the redirection. The external service provider 80 may also include a return identifier parameter which may include an identity provider parameter. A content identifier for identifying the content (such as a TMS ID) and a network identifier for the broadcast network associated with the content may also be provided in the request from the user device or external service provider.

The discovery service 110 may determine whether a common domain cookie exists in block 140. When a common domain cookie does not exist in the redirection signal, a null signal may be returned. In block 140, when a common domain cookie does exist, the redirection request may be parsed in step 142. If parsing is not successful, a return null signal may also be generated.

When parsing is successful, step 143 obtains the last used URL from the list of URLs in the common domain cookie.

The discovery service 110 communicates a response to the external service provider 80 through the response 144. The response signal is communicated to the location received in the redirection request. The response includes a last discovered identity provider location identifier. This may be a universal resource locator 146 such as "HTTP://sp.example.com/disc-consume."

The service provider 80 then generates an authentication request 146 to the identity provider 32C. The authentication request may include a universal resource locator that is received from the identity provider discovery service.

Figure 3:
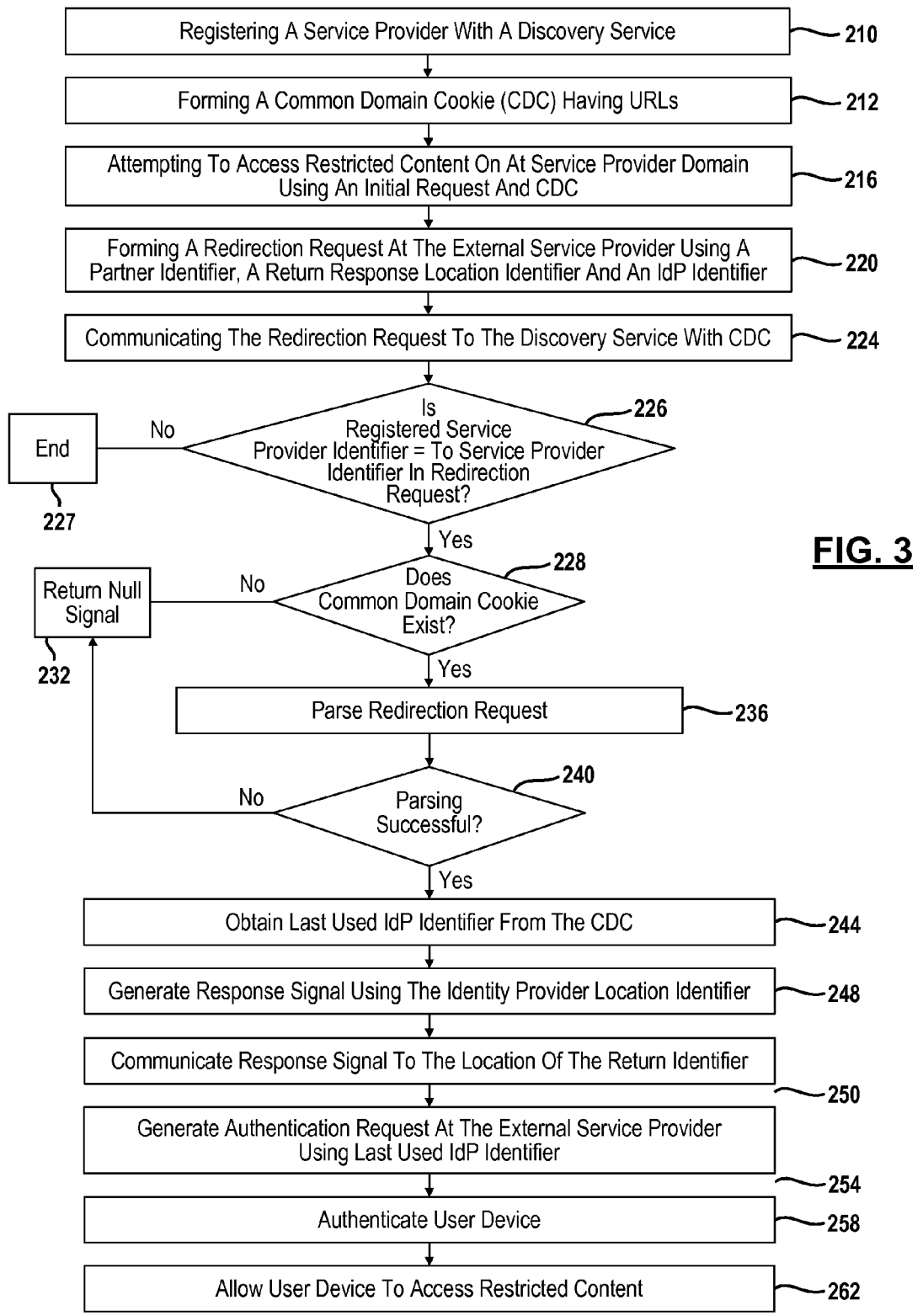
FIG. 3 is a flowchart of a method fro identifying an identity provider according to the present disclosure.

Referring now to FIG. 3, a method of operating the discovery process is set forth. In step 210, the service provider may register with the discovery service so that intercommunication may take place. Registration may be providing a token or identifier that is stored in the discovery service. The redirection request may not be allowed to be processed by the discovery service when the token or identifier is not included in the request. A companion of the token or identifier may be performed when the redirection request is generated.

In step 212, a common domain cookie (CDC) having location identifiers such as uniform resource locators (URLs) may be generated. The CDC may be included in a request header when communications are initiated at the user device. The CDC may be in an HTTP request header.

In step 216, the user device may attempt to access restricted content at the service provider domain using an initial request and a common domain cookie.

In step 220, a redirection request may be generated at the service provider using a partner identifier, a return response location identifier and an identity provider identifier. Because the service provider identifier is pre-registered with the discovery service, the discovery service may accept a redirection request that was communicated by the external service provider. The redirection request may include additional parameters or metadata inserted by the external service provider. The external service provider may include a partner identifier, a return response location identifier and an identity provider identifier.

In step 224, the redirection request is communicated to the discovery service with a common domain cookie.

In step 226 a comparison of a received service provider identifier and an identifier stored during the registration step 210 is performed. When the registration identifier is the same as the service provider identifier received in the redirection request, step 228 is performed. If they are not equal, step 227 ends the process. A notification signal may be generated corresponding to the terminated process.

In step 228, the discovery service determines if a common domain cookie exists in the redirection request. If a common domain cookie does not exist, indicating an error, a null return signal may be generated in step 232.

When a common domain cookie does exist in step 228, step 236 parses the redirection request into its various parameters.

In step 240, it is determined whether the parsing was successful. If the parsing was not successful, step 232 is again repeated which generates a null signal.

In step 240, if the parsing was successful, step 244 obtains the last used identity provider identifier from the common domain cookie. In step 248, a response signal may be generated using the identity provider location identifier. In step 250, the response signal is communicated to the location of the return identifier that was communicated from the redirection request. In step 254, an authentication request at the external service provider is communicated to the identity provider using the identity provider identifier. In step 258, the user device is authenticated. In step 262, the user device is allowed to access the restricted content after authentication.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   registering an external service provider with a discovery service and storing a token for the external service provider in the discovery service, said discovery service associated with a primary service provider;
   forming, at a user device, a common domain cookie comprising a list of identity location identifiers;
   receiving a request for restricted content at an external service provider from the user device, comprising the common domain cookie, said request for restricted content comprising a location identifier for the restricted content;
   forming, at the external service provider, a redirection request based on the request for restricted content, an external service provider identifier, and a return response location identifier;
   communicating the redirection request from the external service provider to the discovery service with the common domain cookie;
   determining, at the discovery service, whether the redirection request originates from the external service provider that is registered based on the token;
   when the redirection request originates from the external service provider that is registered, parsing the redirection request at the discovery service to obtain a previously used identity provider location identifier from the list of identity location identifiers within the common domain cookie and the external service provider identifier;
   generating a response at the discovery service with the previously used identity provider location identifier;
   communicating the response to the external service provider based on the return response location identifier wherein the response comprises the identity provider location identifier;
   generating an authentication request at the external service provider with the previously used identity provider location identifier;
   communicating the authentication request to the identity provider based on the previously used identity provider location identifier;
   authenticating the user device at the identity provider; and
   allowing access to the restricted content based on authenticating.

2. A method as recited in claim 1 wherein receiving the request comprises receiving the request for restricted content at the external service provider from a mobile user device.

3. A method as recited in claim 1 wherein parsing the redirection request at the discovery service to obtain the identity provider location identifier comprises parsing the redirection request at the discovery service to obtain a previously used identity provider location identifier.

4. A method as recited in claim 1 wherein the previously used identity provider location comprises a last used identity provider identifier.

5. A method as recited in claim 1 further comprising forming a common domain cookie that includes a last used identity provider identifier at a user device.

6. A method as recited in claim 1 further comprising communicating a discovery service location to the external service provider.

7. A method as recited in claim 1 further comprising prior to receiving a request, registering the service provider identifier with the discovery service to form a registered service provider identifier.

8. A method as recited in claim 7 further comprising when the service provider identifier is a preregistered service provider identifier, performing the step of parsing.

9. A system comprising:
   a discovery service registering an external service provider and storing a token for the external service provider;
   a user device forming a common domain cookie comprising a list of identity location identifiers;
   said external service provider receiving a request for restricted content from the user device, forming a redirection request based on the request for restricted content, an external service provider identifier and, a return response location identifier; and said discovery service receiving the redirection request from the external service provider with the common domain cookie, when the redirection request originates from the external service provider that is registered, the discovery service parsing the redirection request to obtain a previously used identity provider location identifier from the list of identity location identifiers within the common domain cookie and the external service provider identifier, said discovery service generating a response based on the return response location identifier with the previously used identity provider location identifier;

said external service provider receiving the response, generating an authentication request with the previously used identity provider location identifier and communicating the authentication request to the identity provider based on the identity provider location identifier;

said identity provider authenticating the user device; and said user device accessing the restricted content based on authenticating.

10. A system as recited in claim 9 wherein the user device comprises a mobile user device.

11. A system as recited in claim 9 wherein the common domain cookie comprises a last used identity provider identifier.

12. A system as recited in claim 9 wherein the discovery service parses the request when the external service provider is a preregistered service provider.

\* \* \* \* \*